UNITED STATES PATENT OFFICE.

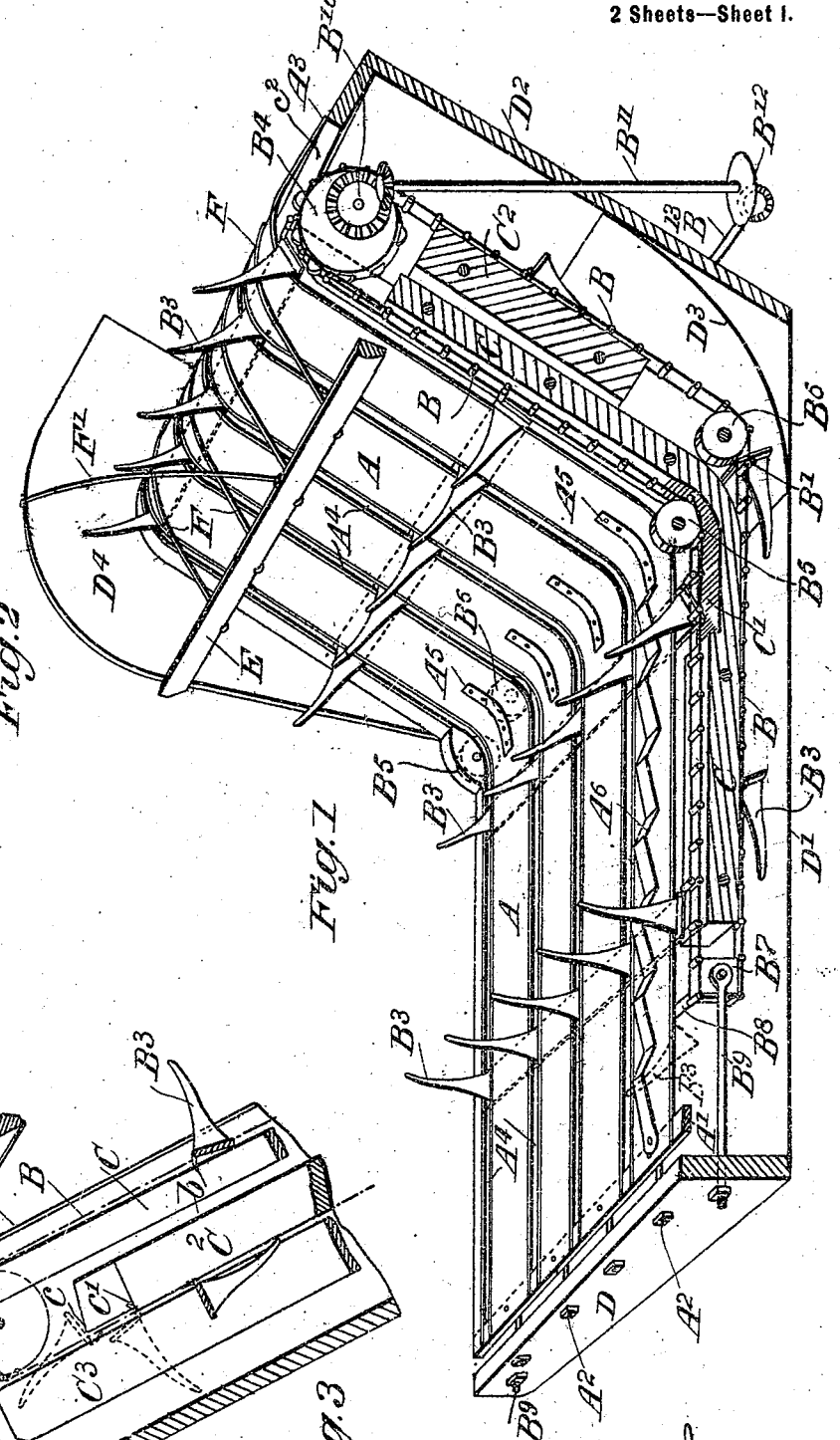
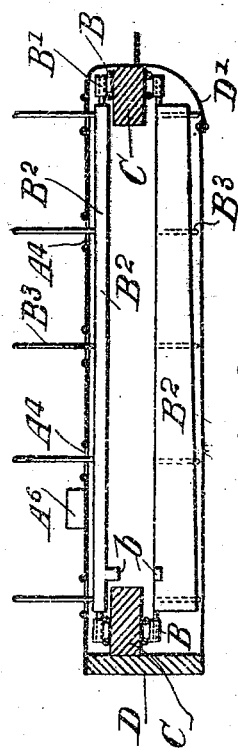
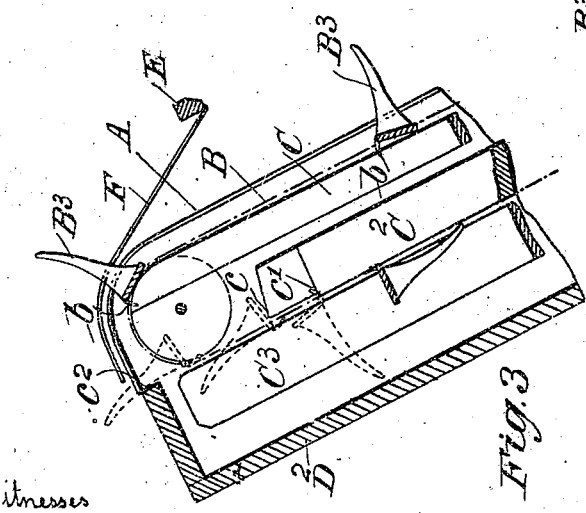

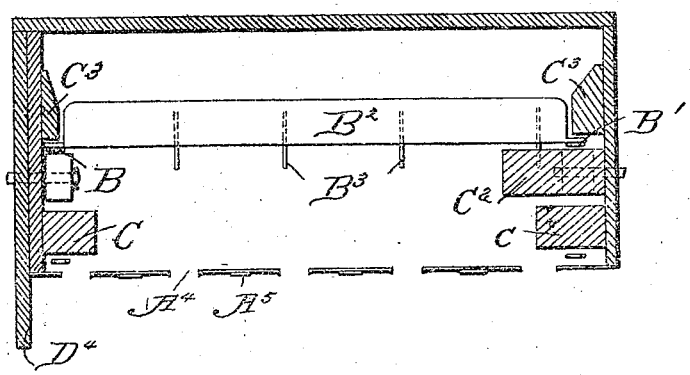

MICHAEL MILLANE, OF RICHMOND, VICTORIA, ASSIGNOR OF ONE-HALF TO ANNIE ELEANORA MILLANE, OF ELSTERNWICK, VICTORIA.

BINDER-HARVESTER.

SPECIFICATION forming part of Letters Patent No. 617,759, dated January 17, 1899.

Application filed January 6, 1896. Serial No. 574,498. (No model.)

*To all whom it may concern:*

Be it known that I, MICHAEL MILLANE, engineer, a subject of the Queen of Great Britain and Ireland, and a resident of No. 10 Rogers street, Richmond, in the British Colony of Victoria, have invented a certain new and useful Improvement in Binder-Harvesters, of which the following is a specification.

This invention of improvements in binder-harvesters consists, mainly, in an endless rake shape combined conveyer and elevator which I employ for conveying the grain over the platform and for elevating and leaving it in position ready for the binder mechanism.

It also consists of a suitable slotted platform or table to admit of the use of the rakes and of the gears and devices for supporting the endless rake and for imparting the requisite action to its teeth.

By the use of my invention canvas conveyers and elevators are entirely dispensed with.

In the accompanying drawings similar letters of reference will indicate corresponding parts throughout the several views.

Figure 1 is a perspective view of as much of the harvester as is necessary to exhibit my invention, the back part of the frame being removed in order to show the chain belt of the elevator and its supporting and controlling gears. Fig. 2 is a transverse section through the platform, and Fig. 3 a detail sectional view of the upper part of the endless rake-elevator and its gears shown in a position reverse to Fig. 1. Fig. 4 is a transverse sectional view taken at right angles to the part $D^2$.

A is the platform or table, formed of a number of thin plates secured at their lower ends to a transverse bar A', and which is in turn fastened by bolts $A^2$ to the end plate D of the frame. The upper ends $A^3$ of plates A are secured, as shown, to the plate projecting inward from the end plate $D^2$.

$A^4$ are the slots between the plates A, and $A^5$ strengthening-ribs secured on plates A at their lower bend.

$A^6$ is a movable serrated bar secured on either of the hindermost bars A, its purpose being to retard the motion of the head ends of the cut crop while traveling thereon and so cause the crop to be carried parallel with the rakes.

B are the endless chain belts—one at each side of the platform-frame—and the links of said chains carry at regular intervals bearings B' to support the journals or pintles of transverse bars $B^2$, which carry the tines or teeth $B^3$ of the combined conveyer and elevator. The chain belts are supported and driven at their upper parts by sprockets $B^4$, while at the bend in the platform or table the chain passes under guide or idle sheaves $B^5$ and $B^6$, while the near ends of the chain belts pass over the tumblers $B^7$, supported at each end of the transverse spindle $B^8$, carried by the adjusting-eyebolts $B^9$ which are attached to aforesaid end plate D of the frame.

$B^{10}$ is the wheel on the spindle of sprockets $B^4$ of a pair of bevel-wheels worked from vertical spindle $B^{11}$, the lower end of which is furnished with bevel-wheel $B^{12}$, driven by a pinion on the horizontal shaft $B^{13}$, and which latter usually imparts motion to the knife-bar. I may here point out that although I show this method of imparting motion to the elevator I do not desire to confine myself to it.

C are bars—one at each side of the platform and forming paths upon which the chains B and the tine or tooth bars $B^2$ travel—said bars C having a rabbeted or depressed surface, as shown at C', to allow the tine-bars to fall or cant backward in order that the elevator-teeth while ascending from the horizontal around the curve will lie at about a radial position therewith.

$C^2$ is a path-plate for the chains and tine-plates when traveling downward under the binder-table, and $C^3$ a ledge, between the edge of which and the path-plate $C^2$ a groove is formed to receive the chain B.

Each of the tine-plates $B^2$ has a short projecting ear $b$ formed on it at about the position shown, and the tines or teeth when passing over the upper sprockets $B^4$ contact with the edge $c^2$ of the plate $D^2$ and are thus drawn inward from the grooves in a line about direct with the chain belt and remains so until the tooth-plate $B^2$ contacts with the top end $c$ of the path-plate $C^2$ and which causes the teeth to again swing to a position at about right angles with the chain, then again lower down the tongue $b$ on plate $B^2$ contacts with the heel or stop $c'$, which turns the bar $B^2$ further over on its end pintles and causes the teeth to lie at a position parallel with the chain, this action of the elevator-teeth and tooth-bar while passing to and over the upper sprockets, as just described, being clearly shown in Fig. 3. The teeth then travel down to and under the platform while lying parallel with the chain, they being retained in such position while under the platform by the end teeth bearing on the path-plate D', and immediately the plates B² pass over the tumbler-rollers B⁷ they ascend to the position indicated by dotted lines (marked B³ in Fig. 1) and pass through the grooves A⁴ to the erect position drawn in full lines in such figure, and are then in readiness to convey and elevate the grain or corn.

D³ is a sweep or path-plate from back plate D² to the under plate D'.

D⁴ is a cheek-plate at fore end of platform, and E a bar secured to the latter and stayed therefrom by the bar F', and it is upon bar E that the seat is usually supported.

F are curved finger-bars springing from bar E to a position just clear of the top curved surface of the plates A, the purpose of the finger-bars F being to press lightly on the grain or corn while being conveyed over the curve and delivered to the binder mechanism.

Having now described my invention, what I claim as new, and desire to secure by Letters Patent, is—

In a harvester-binder, a combined conveyer and elevator comprising a table A partly horizontal and partly inclined provided with several slots A⁴ running along their whole length, the lower end of said table being secured to a transverse bar A' held in position by bolts A² and its rounded upper end secured to a plate projecting inward from the end frame-plate D² of the frame while the bend at foot of incline of said table is strengthened by several ribs A⁵, the guide or path bars C, one under each outer edge of table, said guide-bars being partly horizontal and partly inclined and having a depression C' in them at foot of incline to allow the tine-bars B³ to take a radial position while passing over the curve, the chain path-plate C², the ledge C³ forming a groove for the chain, the contact edge $c^2$ of plate D², the end contact $c$ of path-plate C² to partially cant the tines, and the heel or stop $c'$ to further cant them and cause them to lie parallel with the chain and travel along the under path-plate D', and the endless chain carrying the rows of tines or teeth, substantially as described.

In witness whereof I have hereunto set my hand, in presence of two witnesses, this 7th day of November, 1895.

MICHAEL MILLANE.

Witnesses:
D. R. BODYCOMB,
BEDLINGTON BODYCOMB.